Feb. 7, 1939.　　　　F. WERNER　　　　2,146,242
ARC LAMP COMPRISING A ROTATING ELECTRODE
Filed June 4, 1937
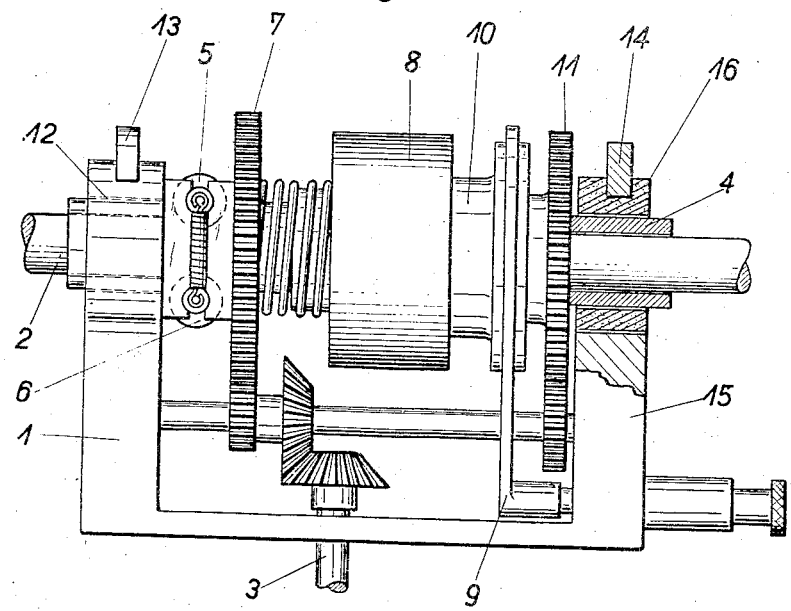
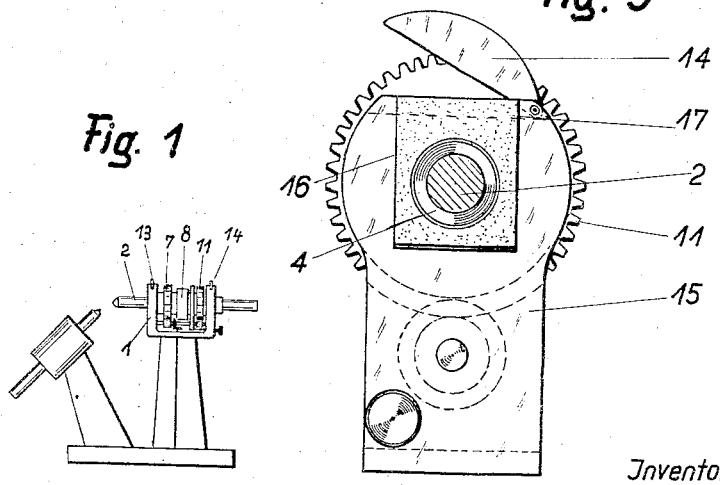
Inventor: Felix Werner
Attorney.

Patented Feb. 7, 1939

2,146,242

UNITED STATES PATENT OFFICE 2,146,242

ARC LAMP COMPRISING A ROTATING ELECTRODE

Felix Werner, Leipzig, Germany, assignor to the firm Körting & Mathiesen Aktiengesellschaft, Leipzig-Leutzsch, Germany Application June 4, 1937, Serial No. 146,512
In Germany June 12, 1936

5 Claims. (Cl. 176—65)

My invention relates to carbon feeding mechanism for electric arc lamps having rod-shaped electrodes, as commonly used in search lights, head lights, projecting apparatus and kindred appliances, wherein an electrode is intermittently advanced while being continuously rotated.

My invention relates particularly to a support or bearing pedestal, preferably U-shaped, in which a rotary sleeve, surrounding the electrode and associated with the feeding means is supported in a rotatable manner.

One of the principal objects of the invention is the provision of such a support or pedestal that will permit removal or insertion of an electrode and its feeding mechanism as a unit.

Other objects will become incidentally apparent hereinafter to those skilled in the art.

The nature and scope of the invention are briefly outlined in the appended claims and will be more fully understood from the following specification taken together with the accompanying drawing in which Fig. 1 shows diagrammatically, in a small scale, an arc lamp for search lights or projecting apparatus, fitted with an electrode support designed according to this invention.

Fig. 2 is a side elevation, partly in section, of an electrode feeding unit positioned in a support according to this invention.

Fig. 3 is an end elevation of the mechanism shown in Figs. 1 and 2 respectively.

In the embodiment of the invention shown in the drawing, the electrode and the electrode feeding mechanism support comprises a U-shaped bearing pedestal having upright portions or arms 1 and 15. Each of these upright portions 1 and 15 is recessed to provide a shouldered seat, open at one side to permit the insertion of the electrode 2, together with the sleeve 4 and the electrode revolving and feeding means. The sleeve 4 is provided with bearing elements 12 and 16. The revolving and feeding means are coupled with a suitable prime mover (not shown) by a driving shaft 3.

The sleeve 4, surrounding the electrode 2, has slots longitudinally extending therein, through which rollers 5 and 6 project, the rollers having sharp circumferential edges for engagement with the electrode 2. Said rollers are so arranged, that the electrode 2 is free to be moved in an axial direction but is positively rotated about its axis jointly with the said rollers 5 and 6. The trunnions of said gripping rollers are journalled in slotted cheek-plates attached to a gear wheel 7, the trunnions being resiliently interconnected by springs.

The clutching and feeding means (not shown in detail) are enclosed in the housing 8 and may be thrown out of engagement with their housing 8 by axial movement of a grooved flange projecting from a collar, the latter being connected with a yoke 9 movable longitudinally by hand.

Means are provided for reciprocating said housing 8 at intervals; said reciprocating means comprise a pin (not shown) rearwardly projecting from said housing 8. A rotary sleeve 10 loosely fits over said rotary sleeve 4 and has a crown cam provided thereon for cooperation with said housing and pin.

A gear wheel 11 connected to said cam sleeve 10 is driven by an auxiliary shaft having a ratio of gearing slightly larger than that of the gear wheel 7.

The two upright portions or arms 1 and 15 of the U-shaped support have recesses forming shouldered seats into which the sleeve 4, surrounded by the clutching and feeding means 5, 6, 7, 8, 10, 11 and bearing elements 12 and 16, are to be introduced from above.

These recesses are closed by pivoted caps 13 and 14.

The Fig. 3 is an end elevation of the mechanism shown in Fig. 2. In the upright portion 15 of the U-shaped support is a recess, into which the square-formed bearing 16 consisting of graphite, a bearing-metal, or the like, and enclosing the rotary sleeve 4 and the feeding electrode 2 has been introduced from above. Said bearing 16 is secured in place by a cap 14 fitting into a groove 17 incised into said bearing element 16 and the arm 15.

The recess and cap in the left upright arm 1 of said support are of like shape, so that for exchanging the clutching and feeding means as a unit, only the two caps 13 and 14 must be opened.

I claim:

1. In an arc lamp having an electrode and mechanism for rotating the same, removable electrode holding means engaging and coaxially surrounding a portion of said electrode, and a support for said means, said support having portions provided with aligned recesses for receiving and positioning said means as a unit by movement of said means in a direction normal to the axis of said support.

2. In an arc lamp having an electrode and mechanism for rotating the same, electrode holding means engaging and coaxially surrounding a portion of said electrode, a support for said means having an upright portion provided with a shouldered seat, and a bearing element for and mounted on said means and positioned in said seat, said shouldered seat receiving said means and bearing element as a unit by movement of said means in a direction normal to the axis of said support.

3. In an arc lamp having an electrode and means for rotating said electrode, the combination comprising a sleeve surrounding a portion of said electrode, means carried by said sleeve engaging said electrode for holding and rotating the same, bearing elements for said sleeve mounted thereon, a support for said bearing elements secured in said arc lamp and including a pair of projecting arms, the outer ends of said arms having recesses therein detachably positioning said bearing elements with said electrode in operative position in said lamp.

4. In an arc lamp having an electrode and means for rotating said electrode, the combination comprising a sleeve surrounding a portion of said electrode, means carried by said sleeve engaging said electrode for holding and rotating the same, bearing elements for said sleeve and mounted thereon, the said bearing elements being grooved along one edge, a support for said bearing elements including a U-shaped member, the upright ends of which are bifurcated to provide open shouldered seats that are aligned to receive and position said bearing elements, and locking members connected to upright ends of the said U-shaped member for engaging the groove in said bearing elements to secure the said elements against lateral displacement in their support and to close the bifurcated ends of the upright portions of said U-shaped member.

5. In an arc lamp having an electrode and mechanism for rotating the same, the combination comprising a sleeve surrounding a portion of said electrode, means carried by said sleeve engaging said electrode for holding and rotating the same, bearing elements for said sleeve, said elements being of bearing-metal and rectangular in shape, a support for said bearing elements secured in said arc lamp and including a pair of projecting arms, the outer ends of said arms having rectangular recesses therein detachably positioning said bearing elements with said sleeve and said electrode in operative position in said lamp.

FELIX WERNER.